United States Patent

Edwards

[15] 3,647,516

[45] Mar. 7, 1972

[54] AIR-DRIED POLYESTER COATING AND APPLICATION

[72] Inventor: Kenneth N. Edwards, 1130 Rossmoyne Ave., Glendale, Calif. 91207

[22] Filed: Oct. 27, 1969

[21] Appl. No.: 869,873

[52] U.S. Cl..............................117/64, 117/132 B, 117/148, 117/161 K, 117/161 UC
[51] Int. Cl........................................B44d 1/26, C09d 3/68
[58] Field of Search.......117/64, 148, 116, 161 UC, 161 AH, 117/161 K, 132 B

[56] References Cited

UNITED STATES PATENTS

| | | | |
|---|---|---|---|
| 2,537,018 | 1/1951 | Barrett | 117/148 X |
| 2,967,174 | 1/1961 | Bartl | 117/148 X |
| 3,029,159 | 4/1962 | Bliven et al. | 117/148 X |
| 3,240,619 | 3/1966 | Winchester | 117/148 X |
| 3,275,710 | 9/1966 | Wooster | 117/148 X |
| 3,498,828 | 3/1970 | Small | 117/161 UC X |

OTHER PUBLICATIONS

"Polyester" by Edward H. Meyer, Modern Plastic Encyclopedia, 1965 Ed., pp. 235–240.

*Primary Examiner*—William D. Martin
*Assistant Examiner*—William R. Trenor
*Attorney*—Beehler & Arant

[57] ABSTRACT

An air-dried polyester coating which is adapted to be applied in successive layers with a very short time interval between applications and which cures to a sandable hardness very rapidly. The polyester is an air-drying resin, and it is crosslinked with bromo- or chlorostyrene monomer.

9 Claims, No Drawings

AIR-DRIED POLYESTER COATING AND APPLICATION

This invention relates to polyester coatings and the application of polyester coatings to various substrates. More particularly, this invention relates to the application of unsaturated air-drying polyester coatings to various substrates and the resultant coatings, wherein the unsaturated polyester is crosslinked with chloro- or bromostyrene.

Previously, air-drying polyester coatings suffered from several disadvantages which have been overcome according to the present invention.

According to the present invention, it is possible to apply a coating of unsaturated air-drying polyester resin containing chloro- or bromostyrene and obtain a tack free surface with a very short period of time. The polyester coating cures completely within a short period of time. This rapid curing rate permits the application of plural coats one upon another at frequent time intervals and also permits the final finishing of the polyester coatings by sanding, polishing, buffing, or otherwise mechanically abrading the surface where these surface treating procedures are to be employed.

The resultant coating is a very dense film which is highly resistant to moisture penetration and is relatively strain free. The coating shrinks as it cures until it reaches a particular thickness within a few hours after it is applied and does not shrink further even over extended periods of time. This is very important where the coating is applied to a substrate, such as wood, where the grain produces slight irregularities in the surface of the substrate which appear on the surface of the coating if the coating shrinks too much.

A wide variety of unsaturated air-drying polyester resins are disclosed in the prior art. The resins which are particularly applicable to this invention include only those in which the air-drying properties are inherent in the polyester itself, and does not include those where additional physical means, such as wax or physical shielding, are employed to protect the surface of the polyester from exposure to oxygen while it is cured.

The air-drying or nonair-inhibited unsaturated polyesters suitable for use in this invention are those which can be cured as thin films in the presence of air or oxygen to produce fully cured surfaces. In general, the polyesters, which are suitable for use in coating compositions, are unsaturated polyesters which have been modified to prevent air inhibition. In general, the modifications of the unsaturated polyesters take the form of modification to the acid or glycol components, or the addition of copolymerizable materials to the unsaturated polyesters.

Nonair-inhibited polyester coatings have been produced using isophthalic or tetrahydrophthalic anhydride or acid in admixture with an ethylenically unsaturated dicarboxylic acid of two to 18 carbons which is free of nonbenzenoid unsaturation where the isophthalic or tetrahydrophthalic anhydride or acid is present in an amount at least equal to 10 mol percent of the total dicarboxylic acid content in the resin. Ethylenically unsaturated dicarboxylic acids, which are suitable for admixture with the isophthalic or tetrahydrophthalic anhydride or acid include; for example, maleic, fumaric, chloromaleic, itaconic, citraconic, and mesaconic, acids, and anhydrides where they exist, and the like. Suitable dihydric alcohols and glycols for use with isophthalic or tetrahydrophthalic anhydride or acid containing polyesters include; for example, ethylene glycol, propylene, butylene, diethylene, dipropylene, triethylene, and higher glycols, 1,2-propylene glycol, 1,3-dipropane diol, thiodiglycol, halogen substituted glycols, and the like. These are conventional glycols known in the art to be useful in the preparation of polyesters.

The glycol component of the polyester can be modified to produce the desired air-drying films. All or a part of the conventional diols can be replaced with ether-oxygen containing alcohols; such as, the polyalkylene ether glycols, polyethylene ether glycol, and polypropylene glycol. Also, air-cured films which are hard and tough and exhibit outstanding gloss characteristics may be produced by using aromatic ether glycols and ethylenically unsaturated aliphatic ether glycols; such as, for example, glycerol alpha-allyl ether and trimethylol propane diallyl ether, the reaction products of ethylene and propylene oxides with trietylene-, tetraethylene-, pentaethylene-, hexaethylene-, and pentabutylene glycols, glycerol monoallyl ether, and the like. The ether glycols are preferably used in admixture with conventional polyester forming glycols, such as propylene and ethylene glycol for use in the preparation of a polyester. Preferably at least 30 mol percent of the conventional glycol is replaced by the ether glycol. Conventional dicarboxylic acids are used with the admixtures of ether glycols and glycols to produce polyesters. Such dicarboxylic acids include, for example, maleic and fumaric acids, anhydrides, and the like.

A wide variety of air-drying polyesters and their methods of preparation are described in Unsaturated Polyesters: Structure and Properties, Herman V. Boenig (1964), Elsevier Publishing Company, New York, at pages 188 through 204. The disclosure of nonair-inhibited polyesters and their preparative methods are incorporated herein by reference.

The cross-linking monomer which is employed according to the present invention is either a monochloro- or a monobromostyrene. The particular isomer employed is not critical; however, in practice a mixture of ortho-, meta-, and paraisomers are used.

The polyester resins suitable for this invention are ordinarily prepared by condensing one or more organic acids with one or more polyhydric alcohols, one or both of the acids or alcohols contains an ethylenic unsaturation. The resultant polyester resin is dissolved in a monobromo- or monochloro- cross-linking agent. The polyester polymerizable monomer compositions, which are substantially 100 percent polymerizable, are conventionally stabilized with inhibitors, such as, for example, hydroquinone to permit their being stored for extended periods. The polyester resins can be utilized in the clear, unpigmented state, or if desired, it may be admixed with fillers, dyes, pigments, opacifiers, lubricants, plasticizers, other modifying agents, and the like.

The substrate to which the coatings of this invention are adhered as films or impregnates include wood, metal, ceramics, cloth, interwoven fibrous material, concrete, and the like.

The following examples illustrate the best modes presently known to me for practicing the principles of this invention.

EXAMPLE I

An air-drying unsaturated polyester is prepared from the following ingredients:

|  | Grams |
|---|---|
| Diethylene glycol | 445 |
| Maleic anhydride | 210 |
| Phthalic acid | 345 |

The ingredients are cooked in an inert nitrogen atmosphere until the temperature of the mass reaches 110° Centigrade whereat an exothermic reaction starts. The temperature of the mass is allowed to rise to 200° C. and is held at that temperature until an acid number of about 50 is reached. One-hundred grams of trimethylol propane diallyl ether is then added. A quantity of hydroquinone in the amount of 0.008 weight percent is added, and the admixture is cooled to a temperature of 150° C. The admixture is divided into three equal parts and each part is mixed with an equal weight of one of styrene monomer, monochlorostyrene monomer, and monobromostyrene monomer.

The three admixtures are then allowed to cool.

EXAMPLE II

The unsaturated polyester-monochlorostyrene admixture prepared in Example I is admixed with 1 weight percent of methylethyl ketone peroxide and is sprayed on a clean sanded poplar wood surface at an ambient temperature of about 70° F. The sprayed surface is allowed to stand for 24 minutes and is then sprayed with the same composition a second time. This procedure is repeated a third time 24 minutes after the second application. The surface is tack free 24 minutes after the application. The resultant polyester coated poplar wood specimen is allowed to stand undisturbed for 2 hours at which time it is sanded and buffed with ease to a very high gloss finish. The coating has a very pleasing appearance of great depth. The unsanded thickness of the coating 2 hours after the application of the last polyester coating is one-sixteenth of an inch. The sanding and polishing operation removes approximately one sixty-fourth inch from the polyester coating. The coating is examined after six months and is found to be unchanged in any detectable feature. The surface of the coating shows no tendency to follow the grain pattern of the underlying poplar wood.

EXAMPLE III

The unsaturated polyester-monobromostyrene admixture prepared in Example I is admixed with 1 weight percent of methylethyl ketone peroxide and is sprayed on a clean sanded poplar wood surface at an ambient temperature of about 70° F. The sprayed surface is allowed to stand for 30 minutes and is then sprayed with the same composition a second time. This procedure is repeated a third time 30 minutes after the second application. The resultant polyester coated poplar wood specimen is allowed to stand undisturbed for 2½ hours at which time it is sanded and buffed with ease to a very high-gloss finish. The coating has a very pleasing appearance of great depth. The unsanded thickness of the coating 2½ hours after the application of the last polyester coating is one-sixteenth of an inch. The sanding and polishing operation removes approximately one sixty-fourth inch from the polyester coating. The coating is examined after 6 months and is found to be unchanged in any detectable feature. The surface of the coating shows no tendency to follow the grain pattern of the underlying poplar wood.

EXAMPLE IV

The unsaturated polyester-styrene admixture prepared in Example I is admixed with 1 weight percent of methylethyl ketone peroxide and is sprayed on a clean sanded poplar at an ambient temperature of about 70° F. The sprayed surface is allowed to stand for 45 minutes and is then sprayed with the same composition a second time. This procedure is repeated a third time 45 minutes after the second application. The resultant polyester coated poplar wood specimen is allowed to stand undisturbed for 4½ hours at which time it is sanded and buffed to a very high-gloss finish. The sanding and buffing takes longer than with the halostyrene systems, and the appearance of the final product is not as pleasing. The unsanded thickness of the coating 4½ hours after the application of the last polyester coating is one-sixteenth of an inch. The sanding and polishing operation removes approximately one sixty-fourth inch from the polyester coating. The coating is examined after 6 months and is found to have shrunk another one sixty-fourth inch. The surface of the coating shows some tendency to follow the grain pattern of the underlying poplar wood.

EXAMPLE V

The examples may be repeated using an equimolar mixture of isophthalic and maleic anhydrides or a mixture of tetrahydrophthalic anhydride and fumaric acid in the molar ratio of 1 to 3, in place of the maleic anhydride-phthalic acid mixture; polyethylene ether glycol in place of the diethylene glycol; and the replacement of 80 weight percent of the diethylene glycol with glycerol monoallyl ether. In each instance the formulations, wherein chlorostyrene or bromostyrene is used, will cure faster and produce a harder, denser, more adherent coating with more uniform properties under a wider variety of environmental conditions of temperature and humidity than will be produced with the styrene containing formulations.

The coatings in this invention may be applied using dual chamber metering spray guns in which the peroxide catalyst is admixed with the polyester resin at the time the polyester is sprayed onto the surface of the substrate. If desired, a curtaining application may be employed where the catalyst and polyester are admixed in a chamber which opens into a downwardly presented slot. The slot is of accurate, predetermined dimensions so that a thin film of polyester flows continuously downwardly through the slot. The object to be coated is then passed underneath the slot through the curtain of falling polyester resin. The object is passed through the curtain of resin at such a rate that its surface receives a uniform application of polyester resin as it passes through the curtain.

Where slow catalyst systems are used, it is possible to employ conventional spraying equipment having only one chamber; however, the curing times are so long as to be impractical for most commercial operations. Various catalyst systems for unsaturated air-drying polyesters are known in the art. The selection of an appropriate known catalyst system for the desired rate of cure is within the skill of the art; however, the use of a monohalostyrene instead of styrene will markedly increase the rate of cure and will improve the density and other properties of the final cured coating.

The bromo- and chlorostyrene containing unsaturated air-drying polyester resins may be applied to the desired substrate in a wide variety of thicknesses ranging from as little as about 0.1 mils or less to one-quarter inch or more. The thicker coatings are generally built up through the successive application of a plurality of thin coatings. With halostyrene containing polyesters it generally requires fewer coats to build up the desired thickness than is required when styrene is used as the cross-linking monomer.

One particularly desirable application for the coatings of this invention is on high quality wooden furniture and musical instruments where a deep, clear finish is necessary for aesthetic purposes. The preferred formulation for use on wooden surfaces is that where the chlorostyrene containing resin of Example I is employed except that propylene glycol is used instead of diethylene glycol. The coating is very dense, hard and resistant to cigarette burns, hot dishes, and other common household sources of fire damage to wood finishes. This fire resistance is obtained without the addition of any additive which might tend to cloud the coating and thus detract from the beauty of the wood finish. This finish has a very clear, deep and aesthetically pleasing appearance.

The polyester coatings according to this invention are very dense and resistant to moisture penetration. This dense, impenetrable coating stabilizes the wood and prevents its deterioration. The dense, hard surface is very amenable to sanding and polishing.

The application of a polyester coating of this invention to an aluminum substrate results in a coating which is very tightly adhered to the aluminum surface and does not tend to peel or flake. The preferred polyesters for application to aluminum or other metallic surface is that where the diol is relatively long-chained so as to impart flexibility to the resultant coating. This permits it to flex with the metallic substrate without cracking.

The monochlorostyrenes are preferred for use in the coatings of this invention for practical reasons. The monochlorostyrenes are more readily available, and their properties are more thoroughly known than are those of the monobromostyrenes.

The chloro- and bromostyrenes are less volatile than styrene so that less of the halostyrenes are lost from the coating while it is being cured. This results in a coating which has more uniform properties throughout its thickness. Also, the temperature and humidity conditions under which spraying takes place are not so critical with halostyrenes because of their reduced volatility. With styrene containing polyester coatings, the properties often vary within rather wide limits because of the different temperatures and humidities prevailing during different seasons or even during different hours of the same day. Also, the decreased quantity of volatile material in the air at the work site reduces the hazards to health occasioned by breathing organic vapors or igniting an explosive atmosphere.

The halostyrene monomer is employed in admixture with the air-drying unsaturated polyester in an amount ranging from about 20 to 80 weight percent of the polyester-halostyrene admixture, and preferably from about 30 to 70 weight percent with many admixtures being between about 40 and 50 weight percent.

The rate of cure is dependent to a certain extent upon the temperature at which the cure is carried out. Satisfactory cures may be obtained using the unsaturated air-drying polyester-halostyrene admixtures of this invention at temperatures of from about 60° Fahrenheit to 350° Fahrenheit. The higher temperatures are produced by stoving, generally with infrared heat lamps. When the substrate to be coated by the polyester-monohalostyrene admixture is a wood work piece, the cure is generally carried out at the ambient temperature of from about 60° F. to 100° F. Under these conditions, it generally takes from about 20 to 30 minutes for the coating to reach a tack free state, and about 2 hours for it to reach a degree of hardness where it can be mechanically abraded, such as, for example, by sanding or buffing. Where metallic substrates are employed and it is desired to greatly increase the curing rate, stoving at temperatures of up to 325° F. and even up to 350° F. will reduce the curing time to between about 10 and 15 minutes for a finish which is hard enough to mechanically abrade.

When desired a cobalt compound may be employed to cause the drying of the surface. The cobalt also brings about the decomposition of the peroxide catalyst. Care should be taken not to mix the cobalt accelerator and the organic peroxide in the undiluted state.

Where a particularly thin coating, such as, for example, a coating which is less than 5 or 10 mils thick is desired, it is possible to thin the unsaturated air-drying polyester-halostyrene compositions with a solvent, such as, for example, ethyl acetate, spray them on to the desired substrate and allow the ethyl acetate solvent to flash off.

If desired, the halostyrene may be diluted with up to as much as 75 weight percent of the combined weight of the resultant admixture with styrene. The benefits of this invention are obtained to a lesser degree with these styrene diluted chloro- and bromostyrene admixtures; however, the preferred admixtures are those in which the halostyrene constitutes at least 50 weight percent and preferably 75 weight percent of the total styrene admixture. Admixtures of chloro- and bromostyrene may be employed if desired.

When it is desired to employ various pigments, leveling agents, fillers and the like, it has been found that the halostyrene coatings cure much more rapidly into a much harder and denser state than do the corresponding styrene containing polyesters. The greater the loading of the polystyrene vehicle with dyes, pigments and the like, the more marked is the difference between the curing rates of halostyrene containing polyesters and styrene containing polyesters. The styrene containing polyesters reach a state where they will not cure to a hard surface at a much lower loading rate than do the halostyrene containing polyesters. This difference between the styrene and halostyrene containing vehicles is particularly marked where the agent with which the vehicle is to be loaded has an inhibiting effect on the curing of the resin. Copper containing blue pigments and cadmium red pigments do retard or delay the curing of polyester resins. The impact of these pigments on the curing rate of halostyrene containing vehicles is substantially less than it is on the curing rate of styrene containing vehicles. Other conventional compounding agents also have some retarding or inhibiting effect on the cure of the vehicle when used at high-loading rates. The compounding agents; such as, fillers, colorants, and leveling agents, may be employed in quantities ranging from less than 1 percent up to 20 or 30 or more weight percent of the total weight of the vehicle. Often where the substrate is valuable because of its appearance, such as fine wooden articles, the only compounding agents employed are inhibitors and catalysts which are present in amounts of less than 0.1 weight percent of the resin vehicle.

As will be understood by those skilled in the art, what has been described are preferred embodiments in which modifications and changes may be made without departing from the spirit and scope of the accompanying claims.

What is claimed is:

1. A method of coating which comprises: admixing an inherently air-drying unsaturated polyester with from about 20 to 80 percent by weight of the resultant admixture of a monohalostyrene monomer having a halogen atom with an atomic weight of less than 80 and greater than 34, admixing said admixture with a polymerization initiator, applying the initiated admixture to the surface of a solid substrate as a film having a cured thickness of from about 0.1 mil to one-fourth inch, and allowing the applied film to cure in air at a temperature of from about 60° F. to 350° F.

2. A method of claim 1 wherein the applied film is allowed to cure at a temperature of less than about 100° F. and a second initiated admixture is applied to the surface of the first film within about 30 minutes after the first film is applied to the solid substrate.

3. A method of claim 1 wherein the applied film is allowed to cure at a temperature of less than about 100° F. and the surface of the applied film is mechanically abraded about 2 hours after the point in time when the film was applied.

4. A method of claim 1 wherein the monohalostyrene is monochlorostyrene and the substrate is wood.

5. An article comprising a cured in situ abradable, dense polyester coating adhered to a substrate, said coating comprising an inherently nonair-inhibited unsaturated polyester crosslinked with a monohalostyrene, the halogen in said monohalostyrene having an atomic weight below 80 and about 34, said coating having a thickness of from about 0.1 mil to one-fourth inch.

6. A coating of claim 5 wherein said monohalostyrene is monochlorostyrene.

7. A coating of claim 5 wherein said monohalostyrene is monobromostyrene.

8. A coating of claim 5 wherein said substrate is wood.

9. A coating of claim 5 including a coloring agent.

* * * * *